Oct. 16, 1928.
T. TURBIS
1,687,909
JOINT FOR COAL MINING DRILLS
Original Filed Oct. 22, 1924    2 Sheets-Sheet 2
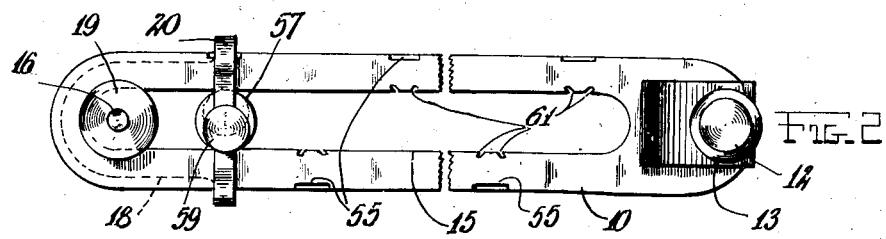
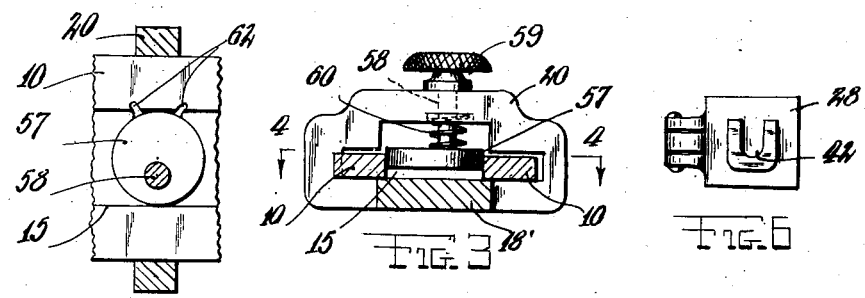
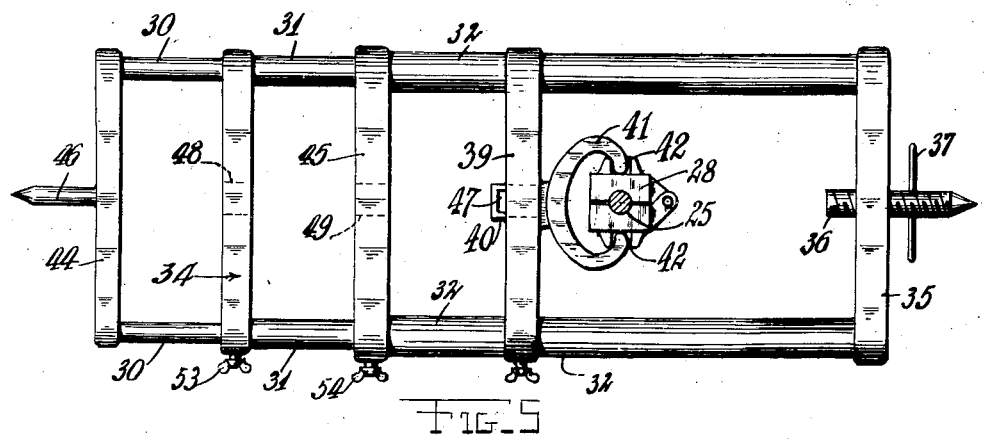
Inventor
Tony Turbis
By
Attorney

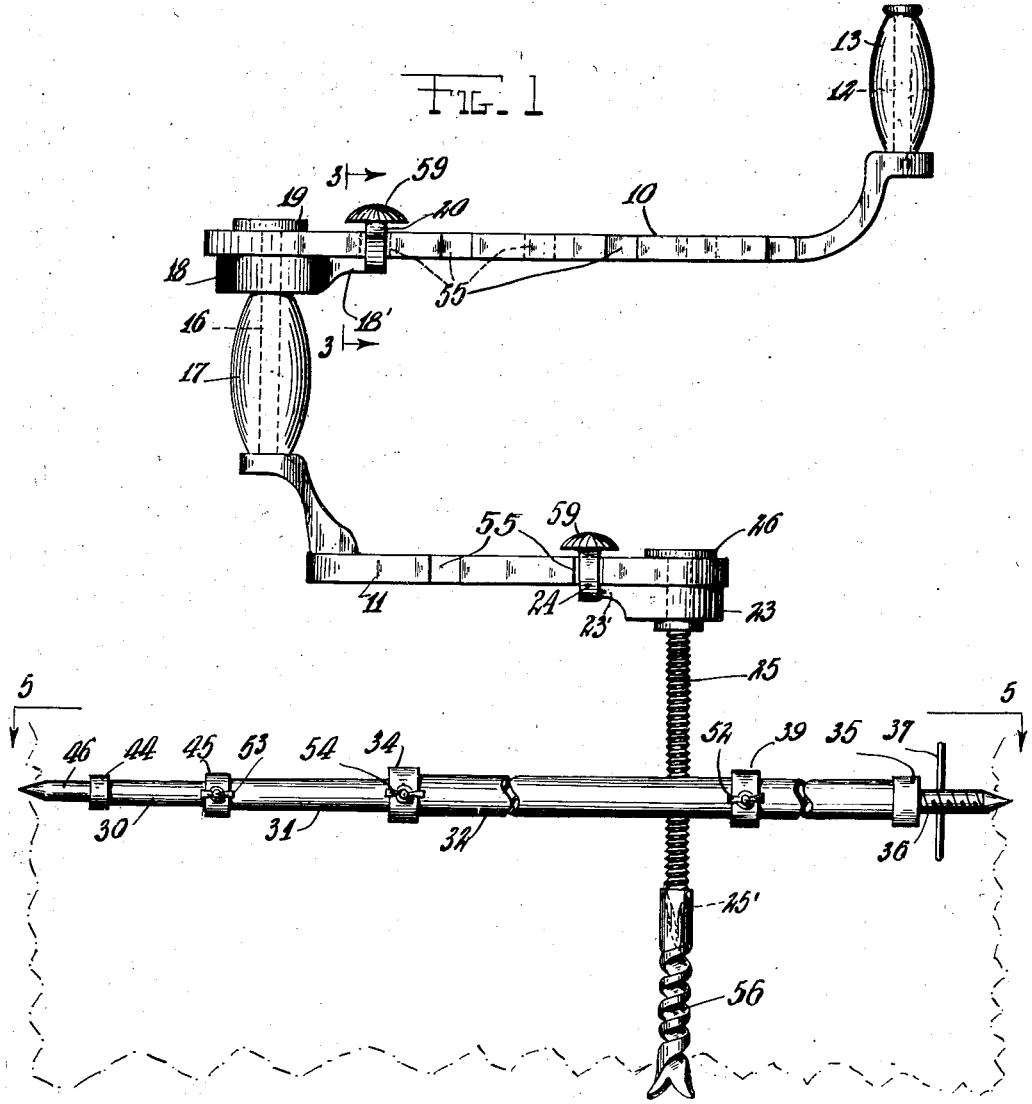

Patented Oct. 16, 1928.

1,687,909

UNITED STATES PATENT OFFICE.

TONY TURBIS, OF NEW KENSINGTON, PENNSYLVANIA.

JOINT FOR COAL-MINING DRILLS.

Application filed October 22, 1924, Serial No. 745,139. Renewed July 20, 1927.

This invention relates to drills such as are used in mining coal, having more particular reference to a hand operated drill.

The invention has for an object to provide a convenient drill of simple construction whose various parts are readily adjustable to suit the drill for operation in more or less constricted spaces.

For further comprehension of the invention, and of the objects and advantages thereof, reference will be had to the following description and accompanying drawings, and to the appended claim in which the various novel features of the invention are more particularly set forth.

Fig. 1 of the drawings is a side elevation of my improved coal drill.

Fig. 2 is a detail plan view of the top arm.

Fig. 3 is a transverse vertical sectional view taken on the line 3—3 of Fig. 1.

Fig. 4 is a detail horizontal sectional view taken on the line 4—4 of Fig. 3.

Fig. 5 is a horizontal section on the line 5—5 of Fig. 1.

Fig. 6 is a detail side view of the split nut.

As here embodied my improved drill comprises a pair of main arms 10 and 11 respectively which are in the form of flat bars. The upper arm, 10, has fixed to one end thereof a stud 12 on which is rotatable a sleeve-like handle 13. Each of these arms is formed with a longitudinal slot 15. The lower arm, 11, has fixed thereto a stud 16 on which is rotatable a sleeve-like handle 17. Fixed to the upper portion of this stud 16 is a flat-topped bracket 18 upon which the upper arm 10 rests. The extreme upper end of the stud 16 projects through the slot 15 and has a washer 19 fixed to its top and overlapping the sides of the slot. The bracket 18 is extended at one side as at 18′ under the arm 10 and from the end of this extension a yoke-piece 20 projects upwardly, straddling the arm, further reference to these parts being presently made.

The lower arm rests on a bracket 23 similar to the bracket 18 and having an extension 23′ formed with an integral yoke-piece 24 similar to the yoke-piece 20. This bracket 23 is suitably fixed on a screw element 25 just below the upper end thereof, the upper end of the screw 25 passing freely through the slot 15 in the arm 11 and having a washer 26 fixed thereto, this washer overlapping the sides of the slot.

The screw 25 passes through a split nut 28 carried by an expansible device forming the abutment member for the drill. This abutment member is here of telescopic construction, comprising two or three pairs of tubes numbered respectively 30, 31 and 32 of which the first two are the telescoping ones. Fixed to the opposite ends of the other pair of tubes, 32, are crosspieces 34 and 35 the latter of which is at the end of the abutment member and has threaded therethrough a pointed screw 36 adapted to engage in an adjacent wall in the coal seam the screw having a crossbar 37 fixed thereto for turning purposes.

Slidable along the tubes 32 is a crosshead 39 in which is rotatably mounted a pin 40 formed with prongs 41 adapted to pivotally engage opposite sides of the nut 28, this pivotal engagement being affected by the prongs projecting freely into recesses 42 in the sides of the nut, these recesses opening upward to permit of insertion and removal of the prongs. By this means the nut has a universal mounting on the abutment member, permitting the drill to be turned in any direction.

Fixed to the exposed ends of the tubes 30 and 31 are crosspieces 44 and 45 the latter of which is at the other end of the abutment member to the crosspiece 35 and has fixed therein a pointed stud 46 alined with the screw 36 and adapted to engage in the opposite wall of the coal seam to that engaged by the screw. The pin 40 is removably held in the crosshead 39 as by a cotter pin 47 and the crosspieces 45 and 34 are formed with respective openings 48 and 49 in which the pin may be inserted to support the nut 28 adjacent either of said crosspieces if desired.

The crosshead 39 may be secured in adjusted positions on the tubes 32 by means of a set screw 52, while the crosspieces 45 and 34 carry set screws 53 and 54, respectively, for locking the telescopic tubes 30 and 31 in adjusted positions. The screw 25 is formed with a polygonal lower end 25′ adapted to engage in a suitable socket in a drilling bit 56 of usual construction.

Referring now to the means for engaging the arms 10 and 11 with the brackets 18 and 23 whereby the effective lengths of the said arms may be varied, each arm is formed on opposite sides with notches 55 spaced therealong, the notches on opposite sides being in staggered relation to each other. The yoke pieces 20, 23 are adapted to be moved laterally into engagement with these notches and are held in such positions each by means of its individual locking disk 57 carried thereby and adapted to project into the slot 15. This disk 57 is fixed eccentrically on the lower end of a pin 58 slidable in the yoke (20 or 24) and having a head 59 on its upper end, the disk being urged downward into the slot by a spring 60 surrounding the pin. Formed in the walls of the slot 15 in registry with the various notches 55 are pairs of small notches 61 while the cam carries a pair of pins 62 adapted to engage in these notches to hold it in adjusted position. It will be understood that the showing in Figs. 2, 3 and 4 will apply also to the arm 11 and the bracket 23 in so far as the adjustability of the former on the latter is concerned.

It is believed that the manner of use of my improved coal mining drill will be readily understood from the above description. The effective length of the main crank element can be varied by altering the positions of the arms 10 and 11 on the brackets 18 and 23, while the abutment member can be varied in length to suit various positions, the abutment member being locked to the walls of the coal seam by turning the screw 36. To adjust either arm 10 or 11 the head 59 of pin 58 is grasped and the disk 57 pulled from the slot 15. The yoke is then swung free of the notch in the arm and the latter is moved until the yoke registers with the desired new notch, one side of the yoke being entered into this notch and the disk re-engaged with the slot 15, the pins 62 entering in the notches 61 and preventing the disk from turning. It should be understood that when it is desired to employ the crank or brace in a confined space the lower arm may be adjusted so as to reduce the distance from its outer extremity to the bit 15 and in this manner the circular locus of the left extremity of the device is reduced in circumference permitting the drill to be employed closer to an obstacle on the left as viewed in Fig. 1.

While I have illustrated and described a preferred embodiment of my invention it is to be understood that I do not limit myself to the precise construction herein shown and that various changes and modifications might be made therein without departing from the spirit and scope of the invention as defined in the appended claims.

Having thus described my invention what I claim as new and desire to protect by Letters Patent of the United States is as follows:

1. A connection for a brace, comprising an arm having a longitudinal slot therein and spaced apart notches communicating therewith, a yoke-piece mounted on said arm comprising a bracket for connecting a bit therewith, an eccentric disc disposed in the longitudinal slot of said arm and suspended from said yoke piece, projections on said disc, and a spring carried by said yoke-piece and urging said disc downwardly to cause the projections thereof to engage in the notches of said arm for retaining said bracket and the bit thereon in a fixed position relative to said arm.

2. A device of the class described comprising an arm having a longitudinal slot therein and spaced notches communicating therewith, a yoke-piece slidably mounted on said arm comprising a bracket to attach a crank element thereto, a pin comprising a head member journaled in an aperture in said yoke-piece, a disc on the end of said pin disposed in said longitudinal slot and comprising spaced projections in the notches of said arm, and a spring disposed between said disc and said yoke-piece and urging the disc downwardly to retain the projections thereof engaged in said notches for retaining said bracket and said arm in a predetermined relation.

In testimony whereof I have affixed my signature.

TONY TURBIS.